United States Patent
Hamburg et al.

[11] Patent Number: 5,974,198
[45] Date of Patent: *Oct. 26, 1999

[54] ADJUSTMENT LAYERS FOR COMPOSITED IMAGE MANIPULATION

[75] Inventors: Mark Hamburg, Scotts Valley; Jason Bartell, Mountain View, both of Calif.

[73] Assignee: Adobe Systems Incorporated, Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/703,024

[22] Filed: Aug. 26, 1996

[51] Int. Cl.$^6$ .................................................. G06K 9/36
[52] U.S. Cl. .................. 382/284; 382/283; 382/285; 382/287; 382/294; 382/295; 382/302; 382/305
[58] Field of Search .................... 382/284, 285, 382/286, 287, 294, 295, 300, 302, 305, 306; 395/133, 135; 345/428, 435

[56] References Cited

U.S. PATENT DOCUMENTS

| | | | |
|---|---|---|---|
| 4,608,327 | 8/1986 | Oka | 430/54 |
| 4,675,725 | 6/1987 | Parkyn | 358/22 |
| 5,162,240 | 11/1992 | Saitou et al. | 437/7 |
| 5,343,252 | 8/1994 | Dadourian | 348/586 |
| 5,388,517 | 2/1995 | Levien | 101/485 |
| 5,487,145 | 1/1996 | Marsh et al. | 395/162 |
| 5,680,528 | 10/1997 | Korszun | 395/135 |

OTHER PUBLICATIONS

Blatner, David et al., *Real World Photoshop 3 Industrial Strength Production Techniques*, pp. 453–455 (1996).
FITS Imaging et al., *Live Picture*, pp. 108–111 (1994).
Wolberg, George, *Digital Image Warping*, pp. 52–56, 214–219 (1990).
Meyers, Scott, *More Effective C++*, pp. 190–194 (1996).

*Primary Examiner*—Leo H. Boudreau
*Assistant Examiner*—Kanji Patel
*Attorney, Agent, or Firm*—Fish & Richardson P.C.

[57] ABSTRACT

A method and system for compositing graphical images, wherein an advanced adjustment layer may be applied during a compositing process to a set of image layers 1 . . . n, or to any subordinate subset of such image layers. One or more adjustment layers are applied to an intermediate merged image, generated by compositing previous image layers, and the adjusted result is stored as a temporary image. The temporary image is then in turn composited with the intermediate merged image. Any remaining image layers are then composited in with the intermediate merged image to generate a final merged image. The invention allows a user to apply a vast array of effects without requiring significant new knowledge on the part of the user. For example, if there are "A" adjustments and "T" transfer modes, the present invention allows A×T effects which leverage existing knowledge of the user of only A+T functions.

3 Claims, 3 Drawing Sheets

ADJUSTMENT LAYERS FOR COMPOSITED IMAGE MANIPULATION

BACKGROUND OF THE INVENTION

1. Field of the Invention

This invention relates to graphical image manipulation systems, and more particularly to a method and system for compositing graphical images.

2. Description of Related Art

A number of graphic image manipulation computer programs build up a final image by compositing several image layers together. An example of one such program is Adobe Photoshop 3.0, from Adobe Systems, Inc. of Mountain View, Calif.

Referring to FIG. 1, each image layer 10 typically comprises the actual image information 12, compositing parameters 14, and, optionally, a mask 16. As is known in the art, the image 12 generally comprises a set of pixels in an m×n array. The compositing parameters 14 generally include such information as a transfer mode (e.g., color model), global opacity information, color-based restrictions on which areas are subject to blending, and other information known in the art.

A number of image layers, 1 . . . n, are merged to form a composite image. In the merge process, each pixel generally is independent of the other pixels of the image 12 within each image layer 10, so an implementing system can equally well calculate pixel data for the entire final image, or just a piece of the final image. FIG. 2 is a block diagram showing diagrammatically that a set of image layers 20 are subjected to a compositing operation 22 to generate a merged image 24, in known fashion. The process of merger may also be represented by the following pseudocode:

```
PROCEDURE CalculateMergedData (layers: ARRAY OF ImageLayer;
result: Image);
VAR i: INTEGER;
BEGIN
    InitializeMergedData (result);
    FOR i = 1 TO LEN(layers) DO
        CompositeImageIntoImage (
            layers[i].image,
            layers[i].compositingParameters,
            layers[i].mask, result)
    END FOR
END CalculateMergedData;
```

In the pseudocode above, the final image, "result", can be initialized either to a solid color or to a value representing transparency.

In existing image manipulation programs, there is a large class of useful image effects based upon functions that are applied to each pixel of an image independently. These functions include operations like inverting the color at a pixel, increasing the brightness of all pixels, etc. Such functions typically are known as "adjustments", and are selectable via a user interface (e.g., menu or icons) of an implementing program, such as Adobe Photoshop 3.0 referenced above. A key property that sets these functions apart from filters (such as blurring operations), is that each pixel in the result only depends on the spatially corresponding pixel in the source image. Adjustment operations generally involve applying a particular function to some pixels based on some global parameters. In addition, frequently a mask is specified to constrain the effect. An adjustment operation is typically invoked by a call to a function such as the following, which specifies an adjustment function and parameters and the mask constraining that function:

```
ApplyAdjustmentToImage (
    adjustmentFunction,
    adjustmentParameters,
    mask,
    image)
```

When applying an adjustment function, the mask is frequently accounted for by using separate images for the initial and adjusted data, and then using the mask to compute a weighted average of the two images. This may require the use of a temporary buffer to hold a copy of the initial image, or to hold the adjusted data before blending it into the original data. This could, for example, result in a code path like the following:

```
ApplyAdjustmentNoMaskFromImageToImage (
    adjustmentFunction,
    adjustmentParameters,
    image,
    tmpImage);
BlendImages (tmpImage, image, mask, image);
```

FIG. 3A is a block diagram showing an image 30 to which is applied one or more adjustments 32 to generate an adjusted image 34, in accordance with the prior art. Thus, for example, an image X may be color corrected by an adjustment to generate image X'.

FIG. 3B is a block diagram showing diagrammatically the application of a simple adjustment to a merged image, in accordance with the prior art. The adjustment data may be stored, for convenience, as a "pseudo-layer" 36, so that the data is part of the array of actual image layers 1 . . . n. The image layers 20 are merged by the application of a compositing operation 22 into a merged image 24. The adjustment function 36 is then applied 38 to the merged image 24 to generate an adjusted merged image 24'. Accordingly, adjustment operations can be readily incorporated into a conventional layer merging process in accordance with the following pseudocode:

```
TYPE
    Layer=      OBJECT
                mask: Image
    ImageLayer= OBJECT EXTENDING Layer
                image: Image;
                compositingParameters: CompositingParameters
                END;
    SimpleAdjustmentLayer=
                OBJECT EXTENDING Layer
                adjustmentFunction: AdjustmentFunction ;
                adjustmentParameters: AdjustmentParameters
                END;
PROCEDURE CalculateMergedData (layers: ARRAY OF Layer;
result: Image);
VAR i: INTEGER;
BEGIN
    InitializeMergedData (result);
    FOR i = 1 TO LEN(layers) DO
        IF layers[i] IS ImageLayer DO
            WITH layers[i] AS ImageLayer DO
                CompositeImageIntoImage (
                    layers[i].image,
                    layers[i].compositingParameters,
                    layers[i].mask,
                    result )
            END WITH
```

```
        ELSIF layers[i] IS SimpleAdjustmentLayer DO
            WITH layers[i] AS SimpleAdjustmentLayer DO
                ApplyAdjustmentToImage (
                    layers[i].adjustmentFunction,
                    layers[i].adjustmentParameters,
                    layers[i].mask,
                    result )
                END WITH
        ELSE
                (* Unexpected layer type! *)
        END IF
    END FOR
END CalculateMergedData;
```

(In the above pseudocode, types declared as OBJECTs are polymorphic records, which are generally accessed via pointers. When an object is declared as EXTENDING another OBJECT type, the object inherits all of the fields of the extended object type. Thus, in the example above, OBJECTs "ImageLayers" and "SimpleAdjustmentLayers" have "mask" fields which they inherit from OBJECT "Layer". The IS expression tests whether a particular object is really a specified extension of its declared type. The WITH statement casts an object to an extension, allowing the program to access fields only defined in that extension— the IS test indicates that it is safe perform this cast.)

In the above pseudocode, for each conventional image layer 1 . . . n (having type "ImageLayer"), conventional compositing 22 is performed to generate the merged image 24. When the simple adjustment layer 36 (having type "SimpleAdjustmentLayer") is detected, the adjustment function is applied 38 to the entire merged image 24 stored in variable "result" to generate the adjusted merged image 24'.

A drawback of the prior products implementing simple adjustment layers is that they do not allow the system to edit the data underneath an adjustment "layer" while viewing the adjustment as applied to the final result. That is, the adjustment function does not truly have characteristics of an image layer. Further, the range of effects presented is generally quite limited.

Accordingly, it would be useful to have greater flexibility in applying adjustments to composited images. The present invention provides the system and method for allowing such flexibility.

SUMMARY OF THE INVENTION

The present invention provides an advanced adjustment layer that may be applied during the compositing process to a set of image layers 1 . . . n, or to any subordinate subset of such image layers. One or more adjustment layers are applied to an intermediate merged image, generated by compositing previous image layers, and the adjusted result is stored as a temporary image. The temporary image is then in turn composited with the intermediate merged image. Any remaining image layers are then composited in with the intermediate merged image to generate a final merged image.

The invention allows a user to apply a vast array of effects without requiring significant new knowledge on the part of the user. For example, if there are "A" adjustments and "T" transfer modes, the present invention allows A×T effects which leverage existing knowledge of the user of only A+T functions.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

In the present invention, instead of thinking of adjustments as operations that change pixels in a result image, adjustments can be thought of as producing new image data amenable to all of the compositing options available for manipulating image layers. Thus, the present invention uses an advanced image layer that permits great flexibility in controlling the adjustment and compositing process.

Figure 1:
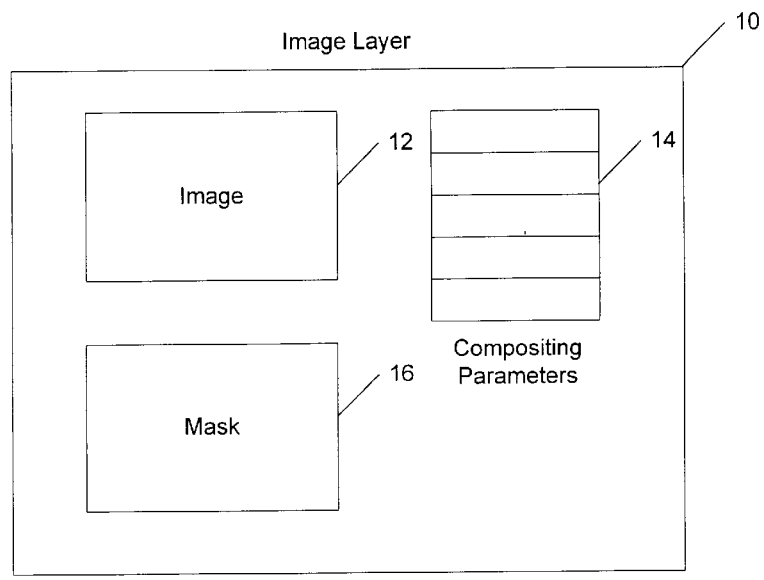
FIG. 1 is a diagram of a prior art image layer, showing the actual image information, compositing parameters, and a mask.
Figure 2:
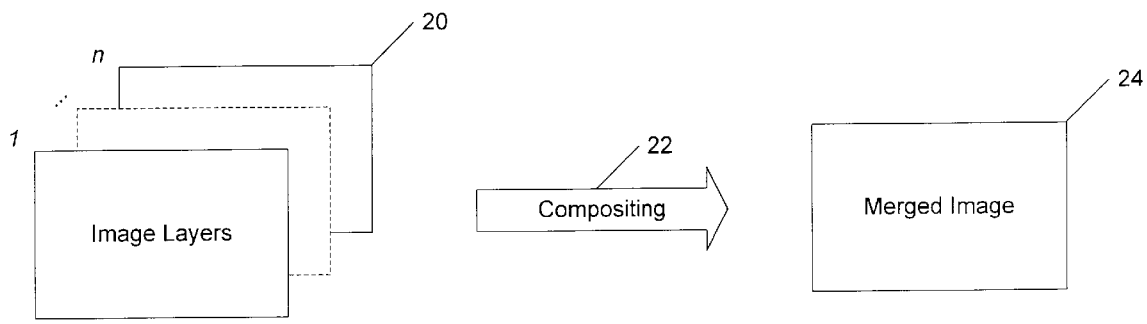
FIG. 2 is a block diagram showing diagrammatically that a set of image layers are subjected to a compositing operation to generate a merged image, in accordance with the prior art.
Figure 3A:
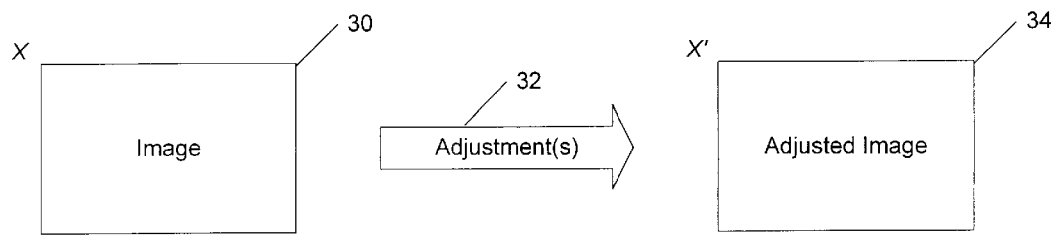
FIG. 3A is a block diagram showing an image to which is applied one or more adjustments to generate an adjusted image, in accordance with the prior art.
Figure 3B:
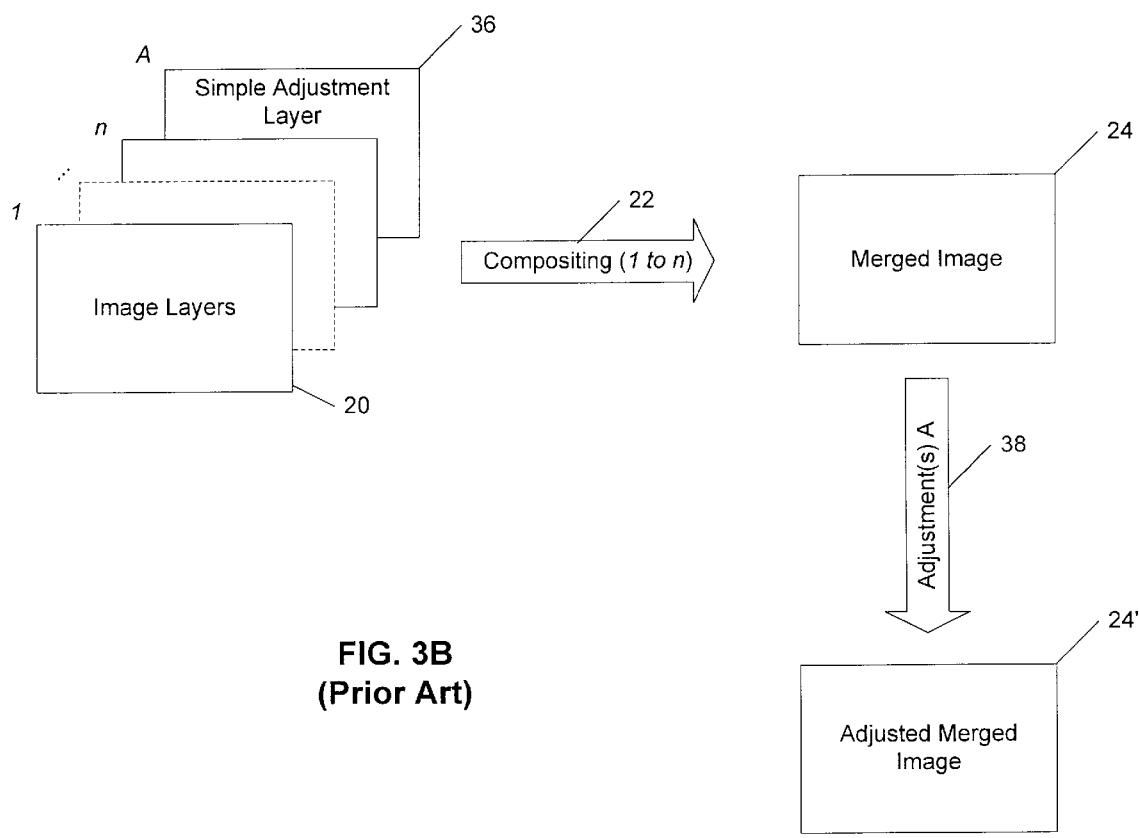
FIG. 3B is a block diagram showing diagrammatically the application of a simple adjustment to a merged image, in accordance with the prior art.
Figure 4:
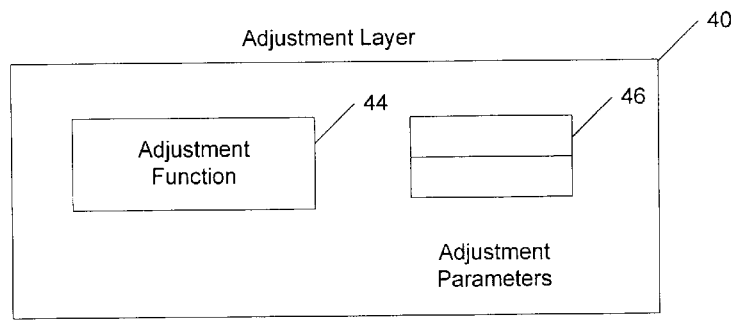
FIG. 4 is a diagram of an adjustment layer comprising an adjustment function and adjustment parameters, in accordance with the present invention.
Figure 5:
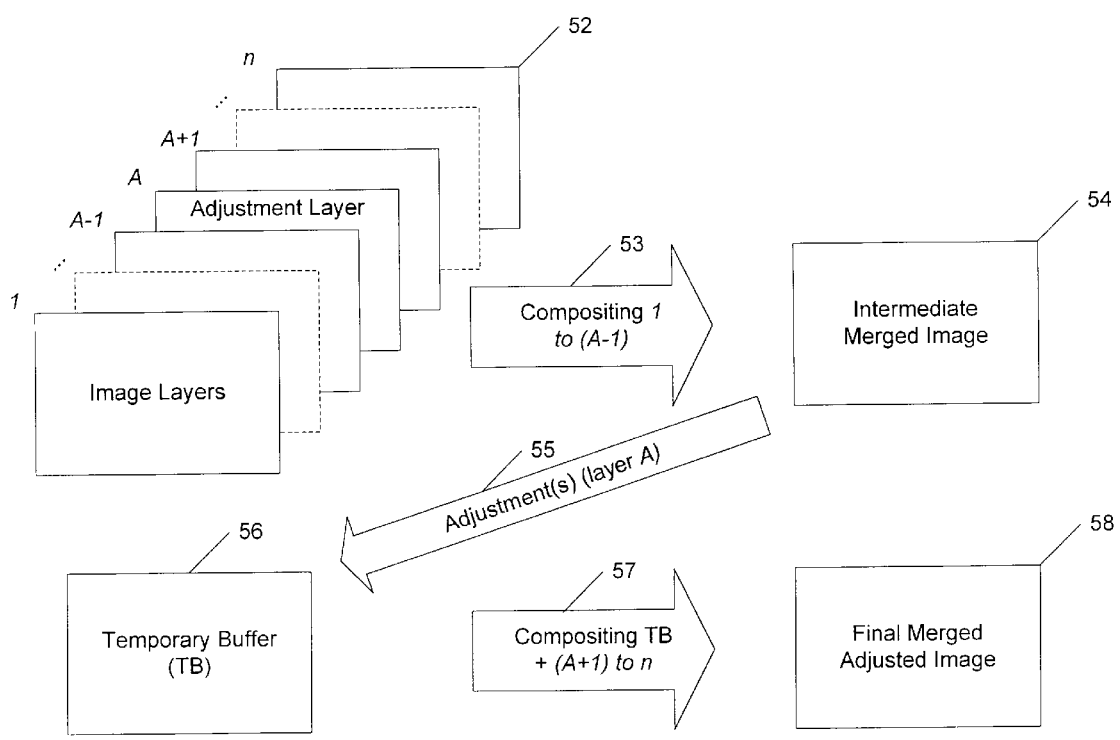
FIG. 5 is a block diagram showing application of the present invention to a set of image layers 1 . . . n, of which at least one layer A is an adjustment layer in accordance with the present invention.

FIGS. 4 and 5 are block diagrams depicting the architecture and use of the present invention. FIG. 4 shows that an adjustment layer 40 in accordance with the present invention comprises an adjustment function 44 (for example, a color correction function) and optional adjustment parameters 46 (for example, parameters specifying the amount of the color correction). Each adjustment layer 40 would also include all inherited structures inherent in being a layer (i.e., mask and compositing parameters). In some instances, or as a matter of design choice, adjustment layers 40 may comprise only an adjustment function 44, with no adjustment parameters (an example would be simple color inversion for a specific color model). However, it is generally preferable to separate adjustment parameters from adjustment functions so that the parameters are readily re-editable.

An adjustment layer 40 is created in conventional fashion by allowing a user to select (e.g., by selecting from a menu or selecting an icon) an adjustment function (e.g., a color correction) and associated parameters. In the preferred embodiment, compositing parameters and adjustment parameters are re-editable after the creation of an adjustment layer. Thus, a user can change the effect of an adjustment at any time.

In FIG. 5, a set of image layers 52 comprises 1 . . . n layers, of which at least one layer A is an adjustment layer.

The hierarchical position of the adjustment layer A within the set of image layers 1 . . . n determines which image layers are operated on by the adjustment layer A. In operation, image layers 1 . . . (A–1) are composited 53 into an intermediate merged image 54. The adjustments 55 defined by adjustment layer A are then applied to the intermediate merged image 54 and the results are stored in a temporary buffer 56. The compositing operation 57 then continues, compositing the contents of temporary buffer 56 with the remaining image layers (A+1) . . . n into a final merged adjusted image 58. Note that the process is iterative if more than one adjustment layer A exists, and that image representation of the final merged adjusted image 58 may differ from the representation used for the image layers 52.

The operations depicted in FIG. 5 may also be described by the following pseudo-code:

```
TYPE
    Layer=      OBJECT
                    compositingParameters: CompositingParameters;
                    mask: Image
                END;
    ImageLayer= OBJECT EXTENDING Layer
                    image: Image;
                END;
    AdjustmentLayer=
                OBJECT EXTENDING Layer
                    adjustmentFunction: AdjustmentFunction ;
                    adjustmentParameters: AdjustmentParameters
                END;
VAR tempImage:  (*A temporary image needed while merging. This is
Image;          presented outside of the procedure below to indicate
                that it may be allocated once at program initiali-
                zation if it is deemed too expensive to allocate
                a temporary image every time the merge code
                is entered.*)
PROCEDURE CalculateMergedData (layers: ARRAY OF Layer;
result: Image);
VAR i: INTEGER;
    srcImage:   (* srcImage is the image that will be composited in-
    Image;      to the result. Note that Image is assumed to be a
                reference - i.e., a pointer type - and hence assigning
                to a variable of type Image is cheap. *)
BEGIN
    InitializeMergedData (result);
    FOR i = 1 TO LEN(layers) DO
        IF layers[i] IS ImageLayer DO
            WITH layers[i] AS ImageLayer DO
                srcImage = layers[i].image
            END WITH
        ELSIF layers[i] IS AdjustmentLayer DO
            WITH layers[i] AS AdjustmentLayer DO
                ApplyAdjustmentNoMaskFromImageToImage (
                    layers[i].adjustmentFunction,
                    layers[i].adjustmentParameters,
                    result,
                    tempImage );
                srcImage = tempImage
            END WITH
        ELSE
            (* Unexpected layer type! *)
        END IF
        CompositeImageIntoImage (
            srcImage,
            layers[i].compositingParameters,
            layers[i].mask,
            result )
    END FOR
END CalculateMergedData;
```

In accordance with the above pseudocode, if an image layer is detected as being of type "ImageLayer", then it is simply composited in conventional fashion into "result". However, if an image layer is of type "AdjustmentLayer", then the adjustment function defined within that layer is applied to the intermediate merged image 54 as it exists to that point in time. Of course, more than one adjustment layer may exist within the set of image layers 52, and the actual adjustment layer information may be stored in other forms and other locations. The results of the application of the adjustment layer are stored in a temporary buffer (variable "tempImage" in the pseudocode above), and then composited into the intermediate merged image (variable "result"). The process continues until all image layers (including adjusted intermediate images) are composited.

The invention allows a user to apply a vast array of effects without requiring significant new knowledge on the part of the user. For example, if there are "A" adjustments and "T" transfer modes, the present invention allows A×T effects which leverage existing knowledge of the user of only A+T functions.

As an example of using the present invention, an implementing system can create an effect based on inverting the color information in an image and then blending that result in such a way that the luminosity of the original color is preserved. As another example, a solarization-like effect can be accomplished by inverting the color in an image and multiplying the color with itself. By using color restrictions on compositing, an implementing system can limit an adjustment effect to a dynamically calculated mask that can depend on either the pre-adjustment data, the post-adjustment data, or both. An implementing system can also gain code compactness by being able to mix and match adjustment logic with compositing logic.

As should be apparent, the invention allows for hierarchical compositing in which sub-ranges in the stack of image layers 52 are composited together and the results are then composited in a next level of the hierarchy. When used with adjustment layers A, this ability allows the system to restrict the effect of an adjustment layer so that it does not affect the entire image without having to create a special mask to do so.

As another aspect of the present invention, the compositing parameters may be used to mask the compositing effect based on pixel-by-pixel properties of either the incoming image or the image to be merged (e.g., the adjusted incoming image). For example, masking can be based on ranges of color values. As an illustration, such masking can select pixels with at least a certain luminance in the image for merging, or protect pixels with at least a certain level of color in the incoming, image. Other masking functions can be used, like restricting compositing to colors inside or outside a printable gamut. Thus, one can create an adjustment layer that applies a desaturation adjustment to any colors that are too saturated to print.

While the preferred embodiment uses adjustment functions that are applied on a one to one basis to each pixel, the concept of the invention can be applied to multi-pixel adjustment functions, such as blurring, where each pixel is adjusted based upon the values of other pixels, such as adjacent pixels. However, multi-pixel adjustment functions do impose some costs, in that in implementing more generalized filtering operations as layers it becomes harder to calculate subareas within a merge image since the filter may require input areas that are larger than the area to be calculated and that a series of filtering layers will produce a cascade effect in which the expanded supports add to each other. When building an entire merged image, these issues are not a problem since all of the data is available, but they could impose processing costs when calculating small areas.

Implementation

The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for applying at least one adjustment during a process of compositing a set of ordered image layers, the set having a logical top layer and a logical bottom layer, into a final merged image, comprising the steps of:
    (a) creating a blank current intermediate merged image;
    (b) defining at least one adjustment layer, each logically ordered within the ordered image layers according to a user selection, each adjustment layer comprising at least an adjustment function;
    (c) compositing each image layer occurring (1) logically between a current adjustment layer and any previous adjustment layer or (2) logically before the current adjustment layer if there is no previous adjustment layer, into the current intermediate merged image;
    (d) applying the adjustment function of a current adjustment layer to the current intermediate merged image to generate a current adjusted temporary image;
    (e) temporarily storing the current adjusted temporary image in a compositable form;
    (f) compositing the stored current adjusted temporary image into the current intermediate merged image;
    (g) repeating steps (c) through (f) for each adjustment layer;
    (h) compositing any remaining image layers into the current intermediate merged image to create a final merged adjusted image,
where the set of ordered image layers and at least one adjustment layer are preserved.

2. A system for applying at least one adjustment during a process of compositing a set of ordered image layers, the set having a logical top layer and a logical bottom layer, into a final merged image, comprising:
    (a) means for creating a blank current intermediate merged image;
    (b) means for defining at least one adjustment layer, each logically ordered within the ordered image layers according to a user selection, each adjustment layer comprising at least an adjustment function;
    (c) means for compositing each image layer occurring (1) logically between a current adjustment layer and any previous adjustment layer or (2) logically before the current adjustment layer if there is no previous adjustment layer, into the current intermediate merged image;
    (d) means for applying the adjustment function of a current adjustment layer to the current intermediate merged image to generate a current adjusted temporary image;
    (e) means for temporarily storing the current adjusted temporary image in a compositable form;
    (f) means for compositing the stored current adjusted temporary image into the current intermediate merged image;
    (g) means for repeating steps (c) through (f) for each adjustment layer;
    (h) means for compositing any remaining image layers into the current intermediate merged image to create a final merged adjusted image,
where the set of ordered image layers and at least one adjustment layer are preserved.

3. A computer program, residing on a computer-readable medium, for applying at least one adjustment during a process of compositing a set of ordered image layers, the set having a logical top layer and a logical bottom layer, into a final merged image, the computer program comprising instructions for causing a computer to:
    (a) create a blank current intermediate merged image;
    (b) define at least one adjustment layer, each logically ordered within the ordered image layers according to a user selection, each adjustment layer comprising at least an adjustment function;
    (c) composite each image layer occurring (1) logically between a current adjustment layer and any previous adjustment layer or (2) logically before the current adjustment layer if there is no previous adjustment layer, into the current intermediate merged image;
    (d) apply the adjustment function of a current adjustment layer to the current intermediate merged image to generate a current adjusted temporary image;
    (e) temporarily store the current adjusted temporary image in a compositable form;
    (f) composite the stored current adjusted temporary image into the current intermediate merged image;
    (g) repeat steps (c) through (f) for each adjustment layer;
    (h) composite any remaining image layers into the current intermediate merged image to create a final merged adjusted image,
where the set of ordered image layers and at least one adjustment layer are preserved.

* * * * *